(12) United States Patent
Funk et al.

(10) Patent No.: US 7,464,035 B2
(45) Date of Patent: Dec. 9, 2008

(54) VOICE CONTROL OF HOME AUTOMATION SYSTEMS VIA TELEPHONE

(75) Inventors: Karsten Funk, Mountain View, CA (US); Sharmila Ravula, Union City, CA (US); Madhuri Raya, San Jose, CA (US); Yao Meng, Sunnyvale, CA (US)

(73) Assignee: Robert Bosch Corporation, Stuttgart (DE)

( * ) Notice: Subject to any disclaimer, the term of this patent is extended or adjusted under 35 U.S.C. 154(b) by 1150 days.

(21) Appl. No.: 10/205,665

(22) Filed: Jul. 24, 2002

(65) Prior Publication Data

US 2004/0019489 A1 Jan. 29, 2004

(51) Int. Cl.
*G10L 21/00* (2006.01)
(52) U.S. Cl. .................. 704/275; 704/273; 704/270
(58) Field of Classification Search ............ 704/270, 704/275, 231, 265, 270.1, 273, 274, 246, 704/257, 272; 370/401; 379/102.06
See application file for complete search history.

(56) References Cited

U.S. PATENT DOCUMENTS

| | | | |
|---|---|---|---|
| 5,086,385 A * | 2/1992 | Launey et al. ............. 704/270 |
| 5,621,662 A | 4/1997 | Humphries et al. |
| 6,041,106 A * | 3/2000 | Parsadayan et al. ..... 379/102.06 |
| 6,101,473 A | 8/2000 | Scott et al. |
| 6,157,848 A | 12/2000 | Bareis et al. |
| 6,185,535 B1 | 2/2001 | Hedin et al. |
| 6,219,638 B1 | 4/2001 | Padmanabhan et al. |
| 6,275,922 B1 | 8/2001 | Bertsch |
| 6,584,439 B1 * | 6/2003 | Geilhufe et al. ............. 704/270 |
| 6,601,031 B1 * | 7/2003 | O'Brien ................... 704/270.1 |
| 6,891,838 B1 * | 5/2005 | Petite et al. ................. 370/401 |
| 6,934,684 B2 * | 8/2005 | Alpdemir et al. ............ 704/265 |
| 6,988,070 B2 * | 1/2006 | Kawasaki et al. ........... 704/275 |

\* cited by examiner

*Primary Examiner*—Huyen X. Vo
(74) *Attorney, Agent, or Firm*—Kenyon & Kenyon LLP

(57) ABSTRACT

A method and system for controlling a home automation system by voice input provided via a telephone unit. A voice portal server receives a signal transmitted by the telephone unit, processes the signal to interpret the voice input, and generates command signals for controlling a home device in the home automation system based on the interpreted voice input. The voice portal server transmits the command signals over a data network or a telephone network to a home interface for receiving the command signals transmitted by the voice portal server. The home interface controls the home device in accordance with the received command signals.

17 Claims, 4 Drawing Sheets

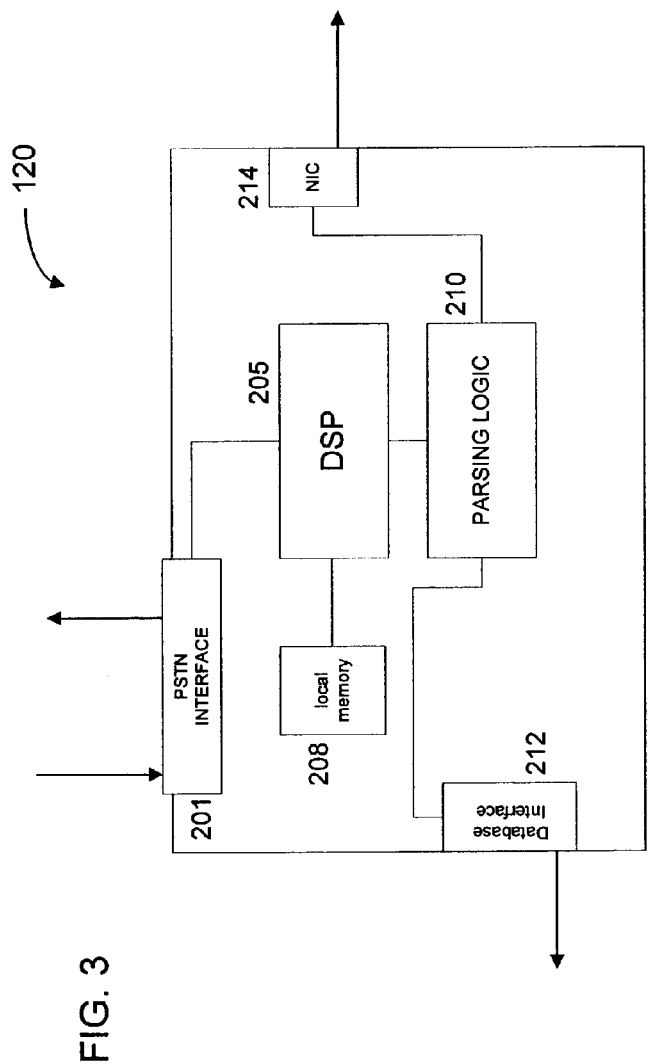

FIG. 3

| VOICED COMMAND | SOUND 1 | SOUND 2 | SOUND 3 | PORT | ACTION | PARAMETERS |
|---|---|---|---|---|---|---|
| 301 "Open Garage" | Garage | Open | | 1 | a | |
| 302 "Close Garage" | | Close | | | b | |
| 303 "Turn on lights in drive way" | Lights in Drive Way | Turn on | | 2 | a | |
| 304 "Turn off lights in drive way" | | Turn off | | | b | |
| 305 "Turn on bedroom heater" | Bedroom Heater | Turn on | | 5 | a | |
| 306 "Turn off bedroom heater" | | Turn off | | | b | |
| 307 Raise temperature of bedroom heater 8 degrees | | Raise temperature | 8 degrees | | c | 8 degrees |

FIG. 4

VOICE CONTROL OF HOME AUTOMATION SYSTEMS VIA TELEPHONE

FIELD OF THE INVENTION

The present invention relates to remote control of automation systems, and in particular, but without limitation, relates to a system and method for remotely controlling a home automation system using voice commands entered via a telephone unit.

BACKGROUND INFORMATION

Home automation systems provide convenience and safety by allowing remote control of electrical appliances and electronic devices within the home. Currently available home automation systems centrally control switches or actuators that are coupled to the various appliances and devices located throughout the home. The switches can be activated by conventional infrared manual remote controls which operate locally, by computer interfaces which further provide for scheduled or timed activation, and by touch tone (DTMF) controllers which activate switches in response to receipt of touch tone signals received over a telephone network. Thus, a home automation system may currently be remotely controlled by establishing an Internet connection and communicating commands to a home computer that is interfaced to the various appliance and device switches, or by establishing a telephone connection with a touch tone controller and entering the various commands by touch tone on a telephone.

Internet connections from a user's location are not always convenient or available and use of touch tone commands is cumbersome because the user is required to memorize all of the relevant command codes relating to the various switches in the home, and the various commands executable by each switch.

Accordingly, it would be useful to provide a home automation system that is convenient but does not require the user to memorize command details.

SUMMARY OF THE INVENTION

The present invention provides a system for controlling a home automation system by voice input. The system includes a telephone unit that receives voice input and transmits a signal representative of the voice input, and a voice portal server that receives the signal transmitted by the telephone unit. The voice portal processes the signal to interpret the voice input, generates a command signal for controlling a home device in the home automation system based on the interpreted voice input, and transmits the command signal. The system further includes a home interface that receives the command signal transmitted by the voice portal server and controls the home device in accordance with the received command signal.

According to an embodiment, the system of the present invention includes a database that stores user profiles. Each user profile includes voice data and command signal information pertinent to a particular user and relates the voice data to the command signal information appropriate for controlling the user's home automation system. The voice portal server queries the database to generate the command signal.

According to a further embodiment, the voice portal server transmits the command signal over a data network, and the home interface is coupled to a home computer gateway that receives the commands signal via the data network.

According to a further embodiment, the voice portal server transmits the command signal over a telephone network, and the home interface includes a touch tone controller coupled to the telephone network.

The present invention also provides a method for controlling a home automation system via voice input. Voice input is received from a telephone unit via a telephone network, the voice input is processed to determine voice characteristics and input information including a desired action, a command signal is generated for controlling the home automation system to perform the desired action, and the command signal is then sent to the home automation system.

According to an embodiment, user profiles including command information, phone number information and voiceprint information are stored and the input information is matched with command information in a user profile corresponding to the provider of the voice input.

According to a further embodiment, a caller providing the voice input from a telephone unit is authorized before the caller is given access to the home automation system according to a further embodiment, the caller is authorized by matching a phone number of the telephone unit to a phone number stored in the user profile and/or by matching input voice characteristics with a voice print stored in the user profile.

According to a further embodiment, it is determined whether the home automation system includes a home computer gateway by consulting the user profile. In a particular implementation, if it is determined that the home automation system includes a home computer gateway, the command signal is sent to the home computer gateway via a data network, such as the Internet. Alternatively, if it is determined that the home automation system does not include a home computer gateway, the command signal is sent to the home automation system via a telephone network using touch tone signals, for example.

The present invention also provides a server configured for providing voice control of a home automation system in response to a received call including an interface to a telephone network for receiving voice data in the call, a processor for analyzing the voice data, and converting the voice data into syntax, parsing logic for determining command information from the syntax, and a database coupled to the processor, the database storing user profiles.

The processor matches the command information with information stored in the user profiles to construct a command signal adapted to the home automation system of the user initiating the received call.

BRIEF DESCRIPTION OF THE DRAWINGS

FIG. 3 illustrates an exemplary telephone voice server for use in controlling a home automation system by voice commands according to the present invention.

FIG. 4 illustrates an exemplary command data table in a user profile in a voice server database according to an embodiment of the present invention.

DETAILED DESCRIPTION

Figure 1:
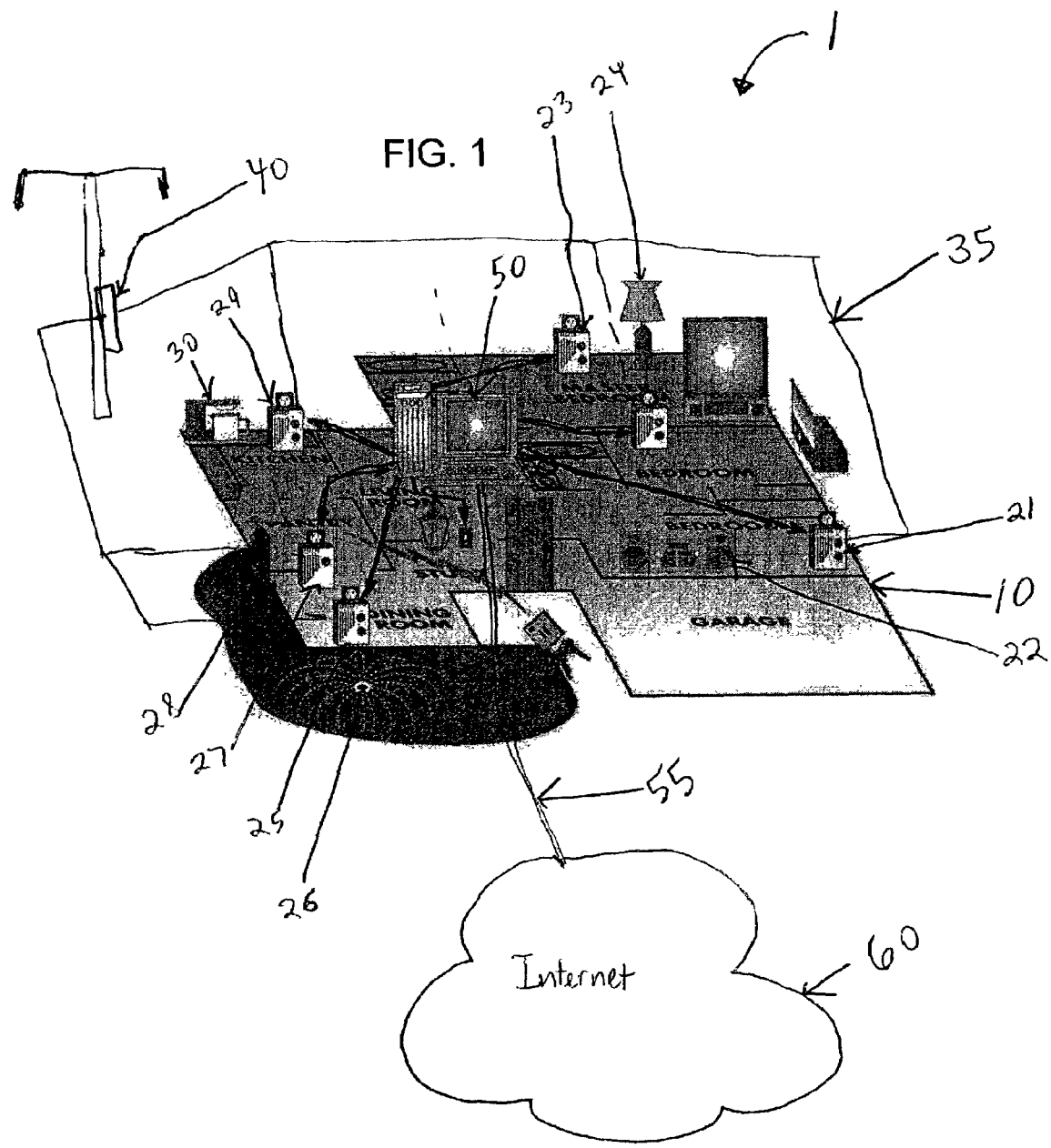
FIG. 1 shows a perspective view of exemplary home automation system according to an embodiment of the present invention.

FIG. 1 shows a perspective view of a home automation system according to an embodiment of the present invention. As shown in FIG. 1, a home automation system 1 centers around a house 10 that includes a plurality of peripheral electrical devices, e.g., 22, 24, 26, 28 distributed in various rooms. The devices are activatable and deactivatable via corresponding device interfaces, e.g., 21, 23, 25, 27, which may be interfaces to a computer system ("home computer gateway") 50 or touch tone controllers as described more fully below. In the exemplary embodiment shown, device 22 is a radio located in a bedroom, device 24 is a lamp located in a master bedroom, device 26 is an outdoor sprinkler and device 28 is a lamp located in a dining room. These devices are exemplary and are not to be taken as limiting the present invention in any way as the house may include other devices such as heaters, an electrically operated garage door, external lights, etc.

The corresponding device interfaces 21, 23, 25 and 27 are coupled to the respective devices in such a way that they can activate, deactivate and otherwise control the devices. For example, device interface 21 coupled to radio 22 may be able to turn the radio on and tune the radio to a particular station. However, the device interfaces are passive in that they activate or control the devices only upon receipt of control commands, which may be, depending on the implementation of the device interface, a command from the home computer gateway 50, or touch tone commands received via a telephone line 35. Accordingly, in order to receive such commands, each of the device interfaces 21, 23, 25, 27 are coupled to the home computer gateway 50 directly or via a local network hub, to a local telephone network interface 40 having touch tone recognition capability (or to both the home computer gateway and the local telephone interface). Additionally, each device interface 21, 23, 25, 27 is associated with a port number so that incoming requests to the home automation system 1 sent to the respective home computer gateway 50 or local telephone network interface 40 can be directed to the appropriate device interface based on port number information included in the request. Furthermore, the home computer gateway 50 may have a direct connection 55, for example a cable or ISDN line 55 to the Internet 60. To facilitate rapid response, the home computer gateway 50 may remain connected to the Internet 60 continuously.

Figure 2:
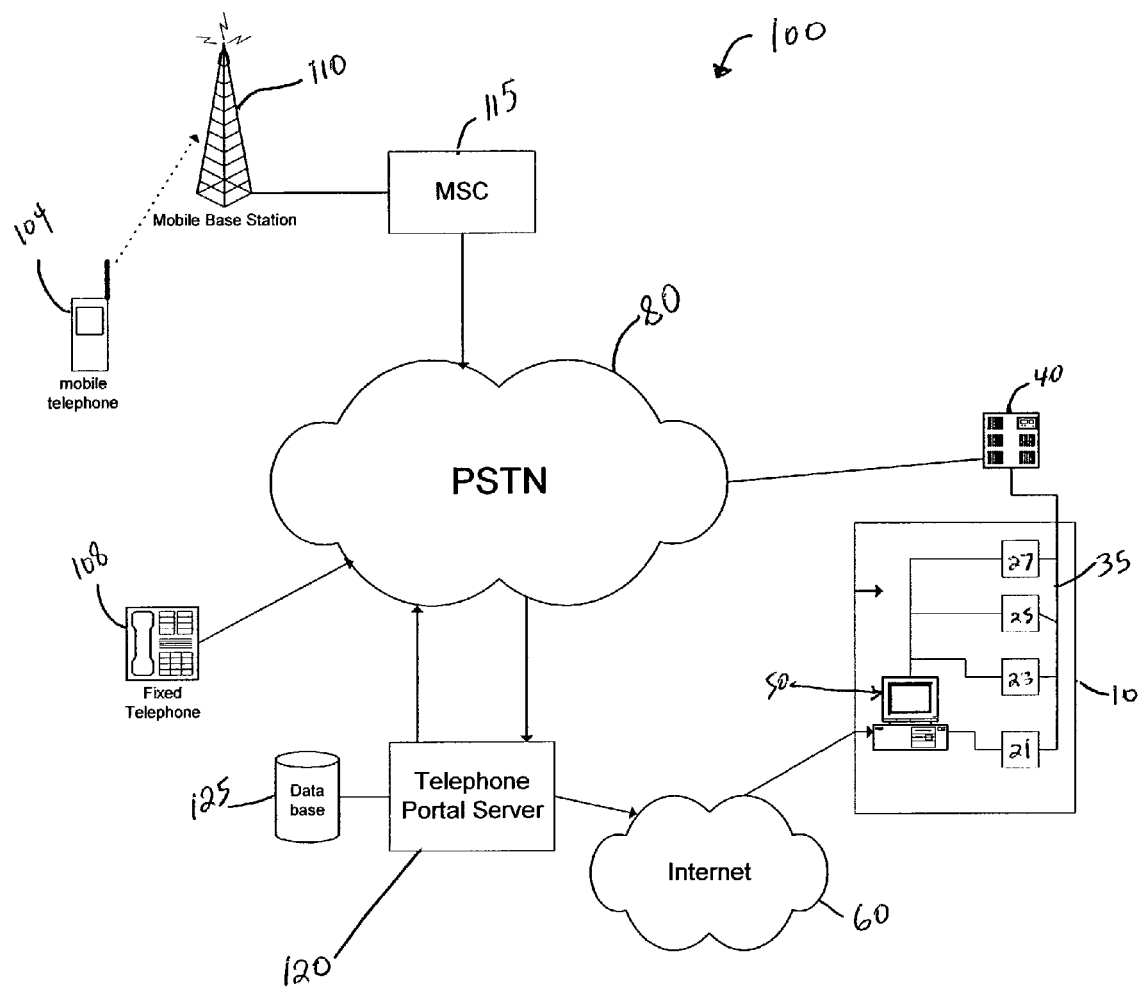
FIG. 2 illustrates an exemplary system for controlling a home automation system by voice commands according to the present invention.

FIG. 2 illustrates a system for controlling a home automation system, such as shown in FIG. 1, by voice commands entered into a telephone unit according to the present invention. The system 100 of FIG. 2 is designed so that a user, such as the owner of house 10, can control the device interfaces through voice commands entered into a mobile telephone unit (handset) 104 or a fixed telephone unit 108. If the user uses a mobile handset 104, the user dials the telephone number of a voice portal server 120 (voice server) via a touchpad, and the mobile telephone sends the dialed number information wirelessly to a mobile base station 110. The base station 110 forwards the dialed number over a wire connection to a mobile switching center (MSC) 115 which is coupled to and acts as a gateway between the mobile network system including the base station 110 and the public switched telephone network (PSTN) 80. The MSC 115 transfers the dialed number information to the PSTN 80 which locates the voice server 120 and then establishes a connection between the mobile telephone 104 and the voice server. It is noted, however, if the voice portal server is coupled directly to the MSC 115 rather than the PSTN 80, that connection to the PSTN would not be necessary. Conversely, if the user is using a fixed handset 108 directly coupled to the PSTN 80, then the dialed number is sent directly to a local switch within the PSTN, and the mobile network is bypassed.

Figure 5:
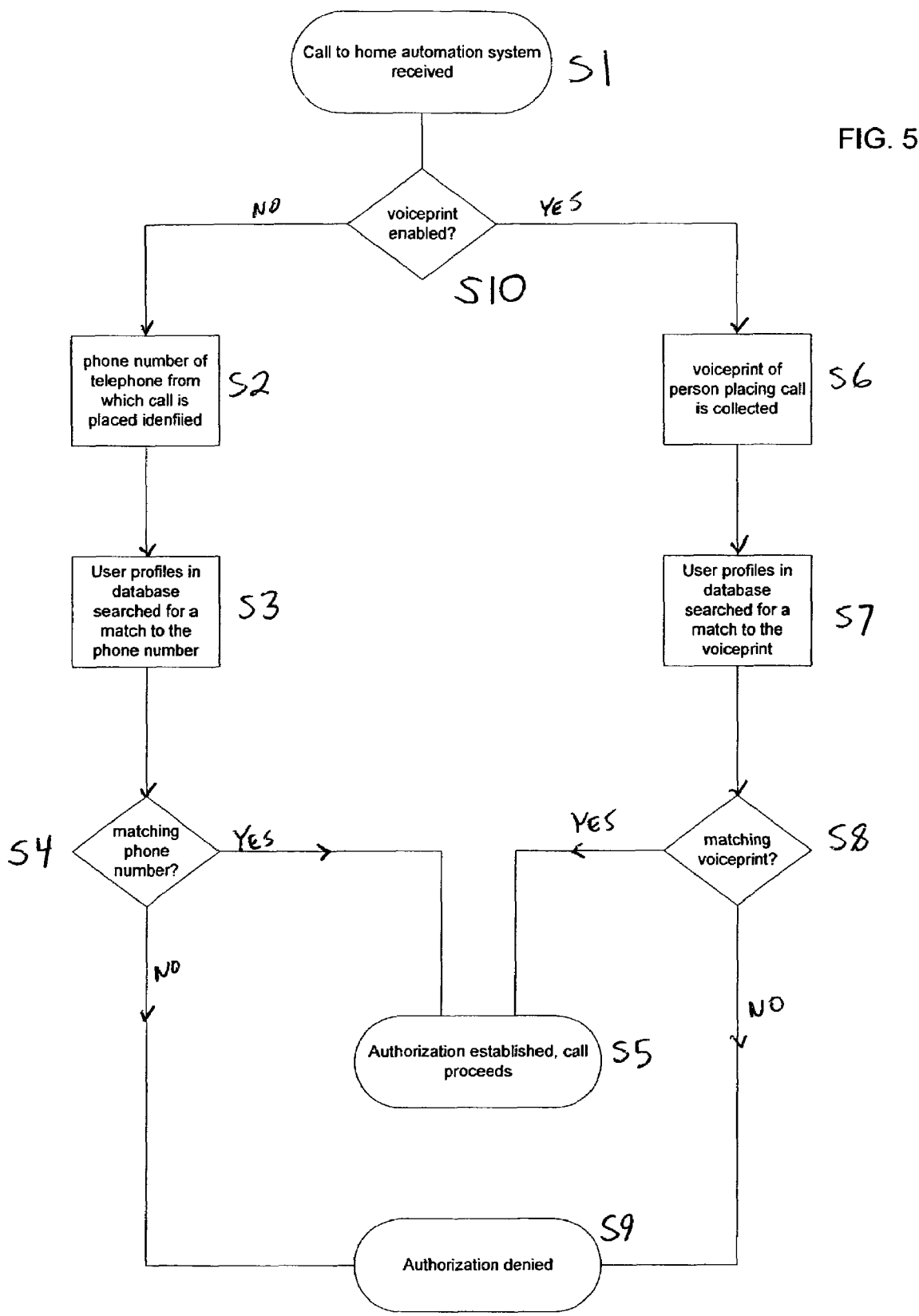
FIG. 5 is flow chart of methods for authorizing access to a home automation system according to the present invention.

Once a call connection has been established between the user and the voice portal server 120 from either a mobile 104, or fixed 108 telephone unit, the voice server 120 determines the authorization status of the caller by referring to a user profile in a database 125 which may be either coupled to the voice portal server or co-located with the server in a hard-disk, for example. Exemplary methods for authorization according to the present invention are shown in FIG. 5. According to one implementation (in cases where voiceprints are not used), after receiving a call (S1), the voice server 120 uses a CallerID function (S2) and searches through authorized user profiles in database 125 (S3) for the phone number of the telephone unit 104, 108 that has initiated the call connection. If the number is found (S4), then the telephone is authorized (S5), and the user is allowed to proceed. Otherwise, the call directed to the home automation system is discontinued (S94). According to another implementation, the voice server 120 uses a speaker verification function (S6) and uses the signals derived from user voice input (a "voiceprint") to determine whether the user, as opposed to the telephone unit, is authorized to use the home automation system 100. In this case, the voice server 120 searches through user profiles in database 125 (S7) for the voiceprint. If there is a matching voiceprint (S8), authorization is granted, otherwise authorization is denied and the call to the home automation system is discontinued (S9). Alternatively, both functions can be used simultaneously, which helps ensure that the home automation system 100 can be only be controlled by an authorized user calling from an authorized telephone unit 104, 108.

If authorization is established, the voice portal server 120 sends a signal via the PSTN 80 or the Internet 60 indicating that a call to the house 10 should be completed. This call could be directed either to the home computer gateway 50 or the local telephone network interface 40, depending upon whether the house is equipped with a local computer system adapted to control the peripheral devices.

Additionally, homes equipped with a home computer gateway 50 can configure their connectivity to the Internet so that the computer acts as a secure gateway accepting only commands from trusted sources (e.g., a trusted Internet server). Therefore, the voice server 120 can be set up as a secure Internet server using an industry standard secure Internet connection using, for example, the Secure Sockets Layer (SSL). Alternatively, if a touch-tone controller is used, a personal identification number (PIN) can be used as an additional security measure for preventing unauthorized access to the home automation system. The PIN is provided before the touch-tone controller will react to given commands sent over the telephone network. The PIN number may be stored in the user profile in the voice server database 125.

FIG. 3 schematically illustrates a block diagram of an exemplary voice server used in connection with the present invention. Calls to the voice server 120 are received from the PSTN (or other telephone network) at a PSTN interface 201. Among other functions, the interface may separate signaling information from media signals, such as a voice signal, transmitted in the incoming call traffic. The PSTN interface 201 may send the received voice signal to a digital signal processor (DSP) 205 which analyzes the voice signal in terms of various characteristics of the signal such as frequency and amplitude. Using these characteristics, the DSP may access a local memory unit 208, such as a hard disk, that may store voice data such as commonly spoken sounds or words, to determine whether the characteristics of the received signal match any of the sounds or words in the local memory. Additional logic incorporated in the DSP may be used to aid in determining matches between signal characteristics and voiced sounds. In this manner, the received voice signal may be translated into syntax. Any matching words or sounds are then delivered serially as a string to a parsing logic unit 210. For example, the DSP 205 may send a string such as "please ◇turn◇off◇light◇in◇bedroom," where ◇denotes a silence. It is noted that although the DSP 205 and the parsing logic 210 are depicted as separate entities, they may be integrated in a single application specific integrated circuit (ASIC), or alternatively, the functions of the DSP and the parsing logic can be performed by a single microprocessor. It is additionally noted that the voice data may be stored on an accessible external database rather than on a local memory unit, as those skilled in the art may readily appreciate.

The parsing logic 210 identifies the informational content of the string using preconfigured grammatical logic rules and vocabulary data, and in particular, distinguishes the content of string in terms of verbs and objects. Using the example above, the parsing logic 210 may determine that the sound "please" can be disregarded, that the sounds "turn" and "off" represent a single verb command, and that the words "light" and "bedroom" represent a device object and a location object respectively.

After processing by the parsing logic 210, the voice server 120 accesses the database 125 via database interface 212 to access the authorized user's profile. FIG. 4 illustrates an exemplary command data table 300 in a user profile stored in database 125 having several records 301-307, each record corresponding to a single command for direction of the home automation system. In record 301, the voiced command "Open Garage" is broken down by the parsing logic 210 into a Sound 1, representing an object "Garage", and a Sound 2, representing a verb "Open." In the record 301, these sounds are associated with a port number "1" and an action designation "a." The Port number indicates the port number of a device interface in the home automation system used for activating the garage door, and the action designation "a" represents an action code readable by the device interface for directing the garage door to open. For closing the garage door, the port number remains the same, as the same device interface is used, but the action code changes to "b," as shown in record 302. Records 303-306 show analogous command information for turning drive way lights on and off and turning on and off a bedroom heater. Record 307 shows a command for raising the temperature of the bedroom heater that includes an additional parameter (Sound 3) besides the device and action command, representing a desired temperature change of 8 degrees. Thus, a single voice command can have varying length and degrees of complexity depending to a large degree on the device capabilities within the home automation system.

The voice server 120 retrieves the Port Number and action code associated with the Sounds 1, 2, 3 etc. from the database 125. The voice server 120 then incorporates the port number and the action code into a command signal. If the voice server 120 determines, from user profile stored in the database 125, that the targeted home automation system 1 includes a home computer gateway 50 coupled to the Internet 60, the voice server generates an IP packet that includes the port number and action code data. This packet is sent to the computer gateway 50 via network interface card 214. Upon receipt of the packet, the home computer gateway 50 extracts the port number and action code, and then transfers a command to the corresponding device interface to actuate the command.

Alternatively, if the voice server 120 determines the home automation system 1 does not contain a home computer gateway 50, the voice server 120 generates a signal using DTMF tones representative of the desired command. For example, for the command shown in record 301 of FIG. 4 associated with port 1 and action c, the signal may contain a DTMF tone representing the number "1", for port 1, followed by a DTMF tone representing the letter "a" (equal to the DTMF tone for 2) for action code "a". Since the DTMF tone for the letter "b" is the same as the tone for the letter "a" in conventional DTMF signaling, the command for record 302 may use a DTMF for the next higher tone (the tone for 3) for the action code "b". Similarly, for the command of record 307, which includes an extra parameter representative of a desired temperature change of eight degrees for a bedroom heater, the tone signals representing the port number and action code are followed by the tone representing the number eight. According to a particular embodiment, after a connection established between the voice server 120 and the local network interface 40, the tone representing the port number in the command signal is detected by the local network interface 40, which then routes the command signal to the device interface corresponding to the detected port number. The device interface then receives the action code tone and activates the home peripheral device accordingly. In the foregoing description, the method and system of the present invention have been described with reference to a number of examples that are not to be considered limiting. Rather, it is to be understood and expected that variations in the principles of the method and apparatus herein disclosed may be made by one skilled in the art, and it is intended that such modifications, changes, and/or substitutions are to be included within the scope of the present invention as set forth in the appended claims. For example, while the command signals described above show examples in which a telephone is used to activate devices within the home, voice commands can equally be queries with regard to the status of the various devices within the home. For instance, according to the present invention, an authorized user might input the query "is the bedroom heater on?" into a telephone, initiating a query command to which is delivered to the appropriate port of the home automation system. The automation system, in turn, returns a signal, through either the Internet or the PSTN, indicative of the status of the bedroom heater. This signal is intercepted by the voice server, which may translate the signal into automated speech so that the authorized user hears "On" or "Off."

What is claimed is:

1. A system for controlling a home automation system by voice input comprising:

a telephone unit, the telephone unit receiving voice input and transmitting a voice signal representative of the voice input via a telephone network;

a voice portal server receiving the voice signal transmitted by the telephone unit, the voice portal processing the voice signal to interpret the voice input, generating a command signal for controlling a home device in the home automation system based on the interpreted voice input, and transmitting the command signal via the telephone network;

a home interface for receiving the command signal transmitted by the voice portal server and controlling the home device in accordance with the received command signal; and a database storing user profiles having voice data and command signal information and relating the voice data with the command signal information;

wherein the voice portal server is configured to:
   determine whether the home automation system includes a home computer gateway by consulting the user profiles;
   if the determination is that the home automation system includes the home computer gateway, send the command signal to the home computer gateway via a data network; and
   if the determination is that the home automation system does not include the home computer gateway, send the command signal to the home automation system via the telephone network.

2. The system of claim 1, wherein the voice portal server queries the database to generate the command signal.

3. The system of claim 2, wherein the home interface includes a touch tone controller coupled to the telephone network.

4. The system of claim 3, wherein the telephone network is the Public Switched Telephone Network (PSTN).

5. The system of claim 3, wherein the command signal includes port number information for the home device and an action code and is implemented as a touch tone signal.

6. The system of claim 2, further comprising:
   a mobile switching center coupled to the voice portal server;
   wherein the telephone unit is a mobile phone which transmits signals to the voice portal server via the mobile switching center.

7. The system of claim 2, wherein the user profiles store phone numbers and voiceprints, and the voice portal server authorizes an attempt of a caller using a first phone number by at least one of:
   matching voice input with a stored voiceprint in the user profiles; and
   matching the first phone number with a stored phone number in the user profiles.

8. The system of claim 1, wherein the home interface is responsive to a received query command signal directed to a home device to determine a status of the home device and to send a signal indicative of the status to the voice portal server.

9. A method for controlling a home automation system via voice input comprising:
   receiving a voice signal transmitted from a telephone unit via a telephone network, the voice signal being representative of the voice input;
   processing the voice signal to determine voice characteristics and input information, the input information including a desired action;
   storing user profiles, the user profiles including command information, phone number information and voiceprint information;
   matching the input information with command information in a user profile corresponding to the provider of the voice input;
   based on the processing, generating a command signal for controlling the home automation system to perform the desired action;
   determining whether the home automation system includes a home computer gateway by consulting the user profile;
   if it is determined that the home automation system includes a home computer gateway, sending the command signal to the home computer gateway via a data network; and
   if it is determined that the home automation system does not include a home computer gateway, sending the command signal via the telephone network to the home automation system.

10. The method of claim 9, further comprising:
   authorizing a caller providing the voice input from a telephone unit before providing the caller access to the home automation system.

11. The method of claim 9, wherein the caller is authorized by at least one of:
   matching a phone number of the telephone unit to a phone number stored in the user profile; and
   matching input voice characteristics with a voice print stored in the user profile.

12. A method for controlling a home automation system via voice input, comprising:
   receiving a voice signal transmitted from a telephone unit via a telephone network, the voice signal being representative of the voice input;
   processing the voice signal to determine voice characteristics and input information, the input information including a desired action;
   storing user profiles, the user profiles including command information, phone number information and voiceprint information;
   matching the input information with command information in a user profile corresponding to the provider of the voice input;
   based on the matching, generating a command signal for controlling the home automation system to perform the desired action;
   determining whether the home automation system includes a home computer gateway by consulting the user profile;
   if it is determined that the home automation system includes a home computer gateway, sending the command signal to the home computer gateway via a data network; and
   if it is determined that the home automation system does not include a home computer gateway, sending the command signal to the home automation system via the telephone network.

13. The method of claim 12, wherein the data network is the Internet.

14. The method of claim 12, wherein the command signal sent via the telephone network includes touch tone signals.

15. A server configured for providing voice control of a home automation system in response to a received call comprising:
   an interface to a telephone network for receiving voice data representative of an inputted voice signal that originated in the call and transmitted via the telephone network;
   a processor analyzing the voice data, and converting the voice data into syntax;
   parsing logic for determining command information from the syntax; and
   a database coupled to the processor, the database storing user profiles;
   wherein the processor:
      matches the command information with information stored in the user profiles to construct a command signal adapted to the home automation system of the user initiating the received call and the server transmits the command signal to the home automation system via the telephone network;

determines whether the home automation system includes a home computer gateway by consulting the user profiles;

if it is determined that the home automation system includes a home computer gateway, sends the command signal to the home computer gateway via a data network; and if it is determined that the home automation system does not include a home computer gateway, sends the command signal to the home automation system via the telephone network.

16. The server of claim 15, wherein the processor authorizes the received call to control the home automation system by comparing voice data in the call to a voiceprint stored in a user profile in the database.

17. The server of claim 15, wherein the processor authorizes the received call to control the home automation system by comparing phone number information extracted from the received call with phone number information stored in a user profile in the database.

* * * * *